Oct. 13, 1953   A. McDONALD   2,654,910
APPARATUS FOR MANUFACTURING FLOOR MATS
Filed April 19, 1948   9 Sheets-Sheet 1
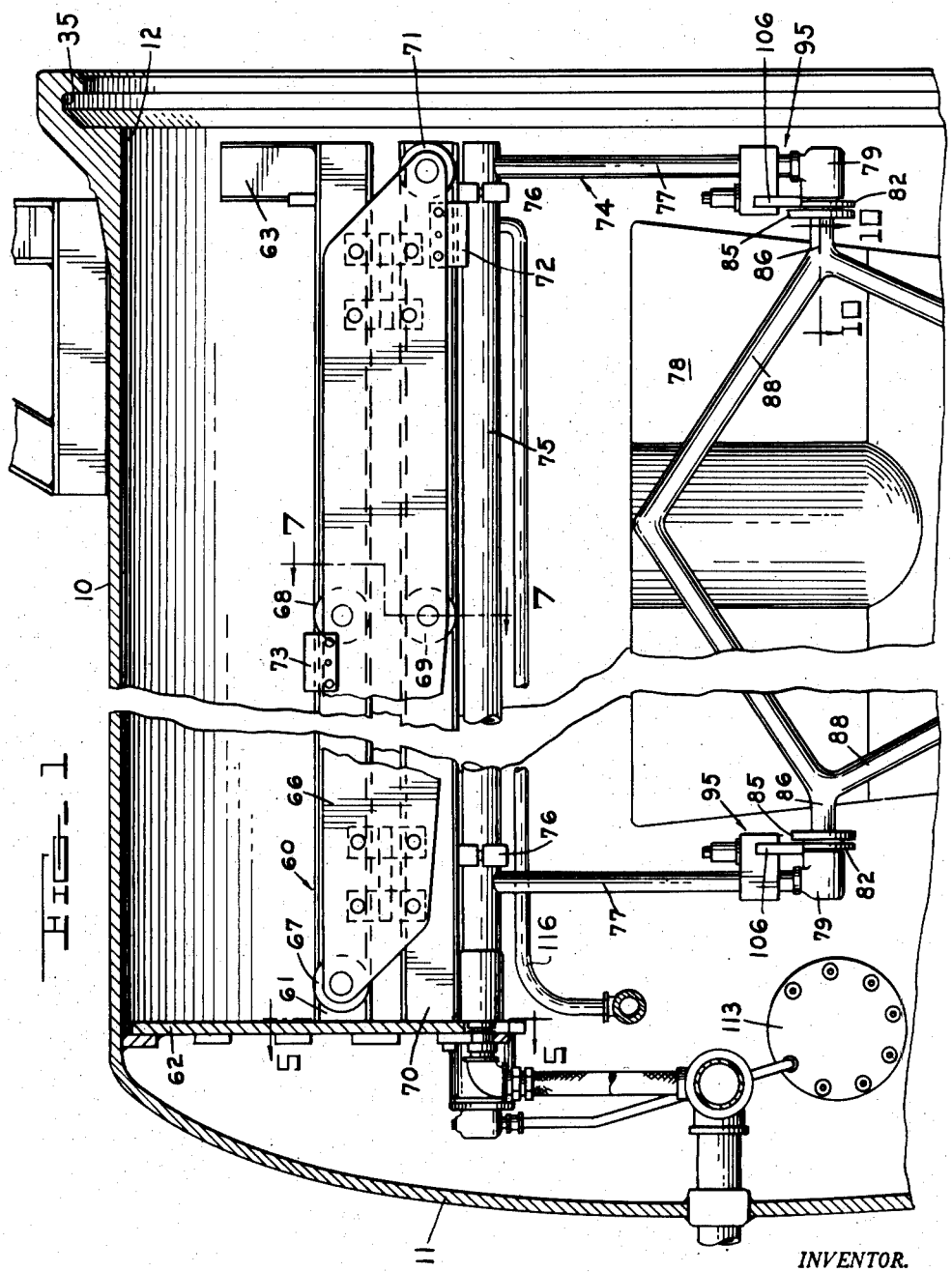
INVENTOR.
ANGUS MC DONALD
BY
ATTORNEYS

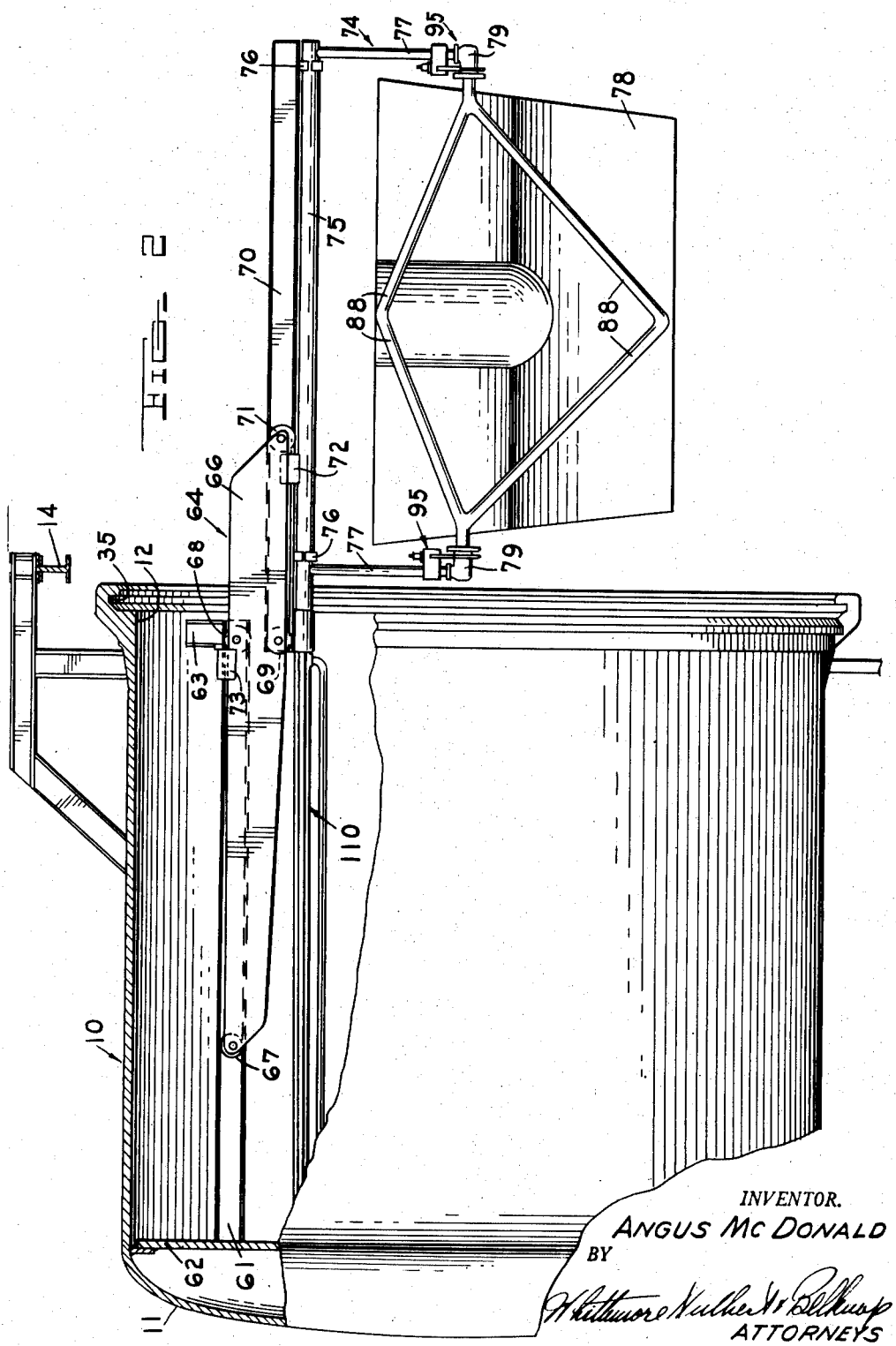

Oct. 13, 1953     A. McDONALD     2,654,910
APPARATUS FOR MANUFACTURING FLOOR MATS
Filed April 19, 1948     9 Sheets-Sheet 3
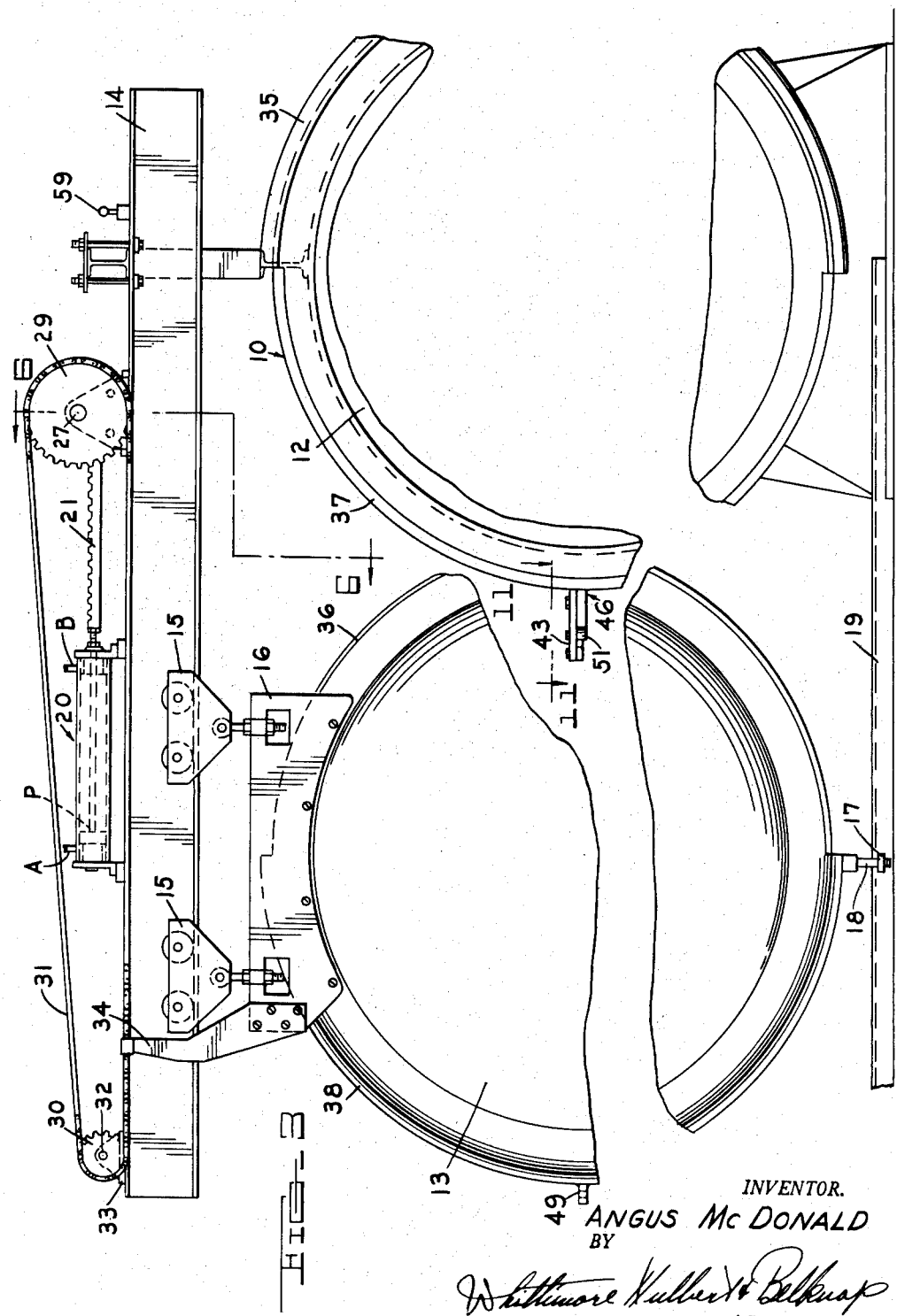
INVENTOR.
ANGUS McDONALD
BY
ATTORNEYS

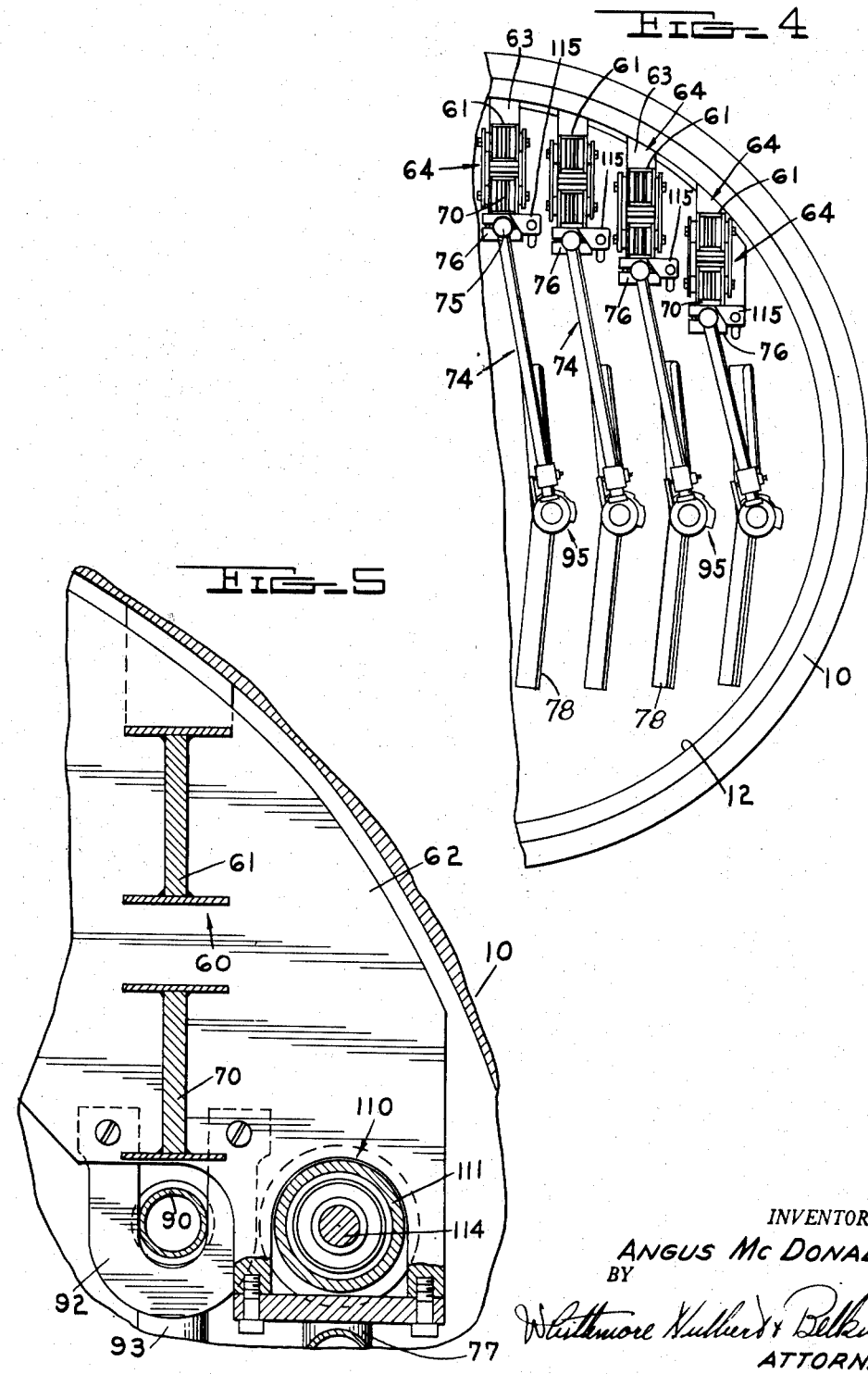

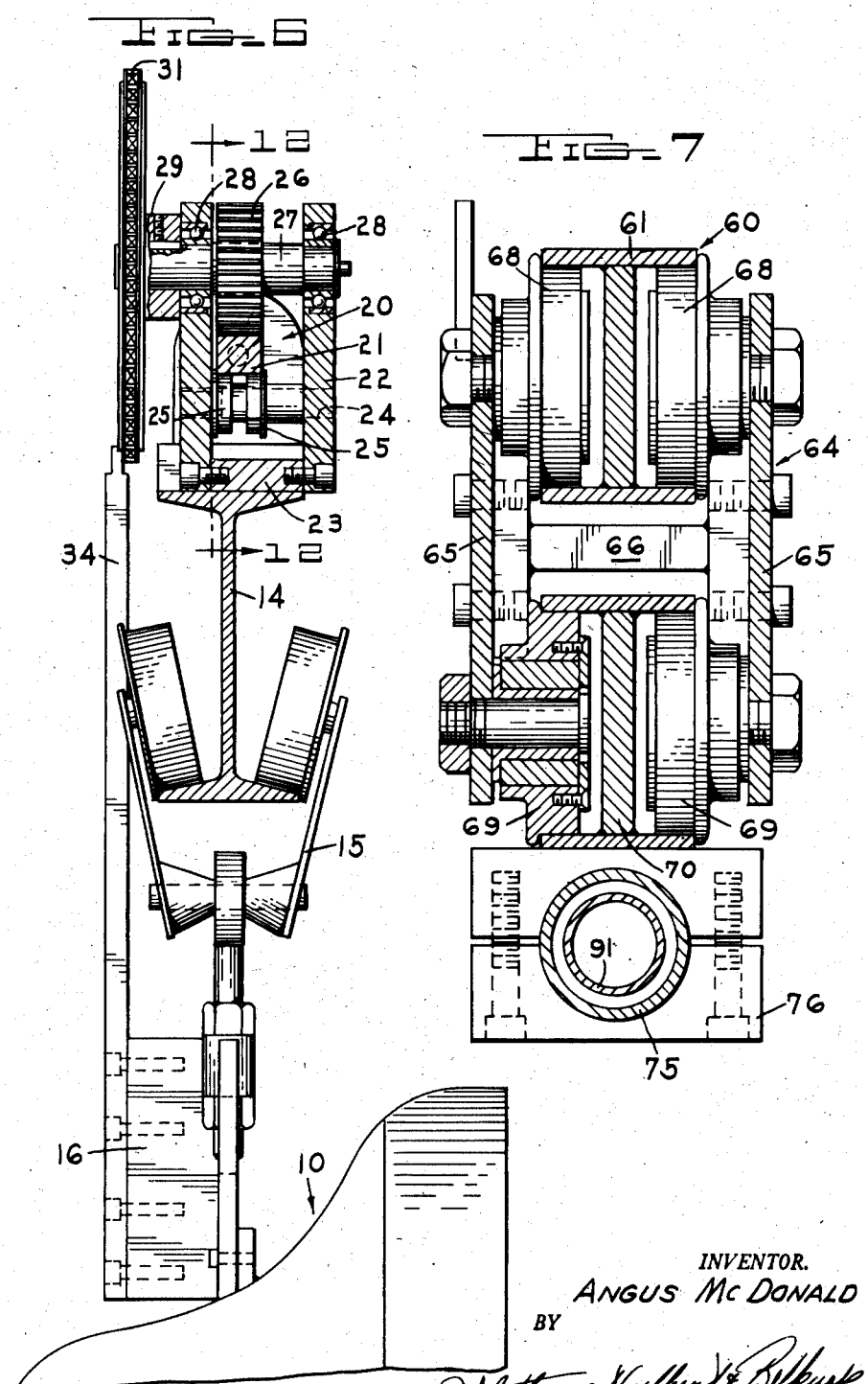

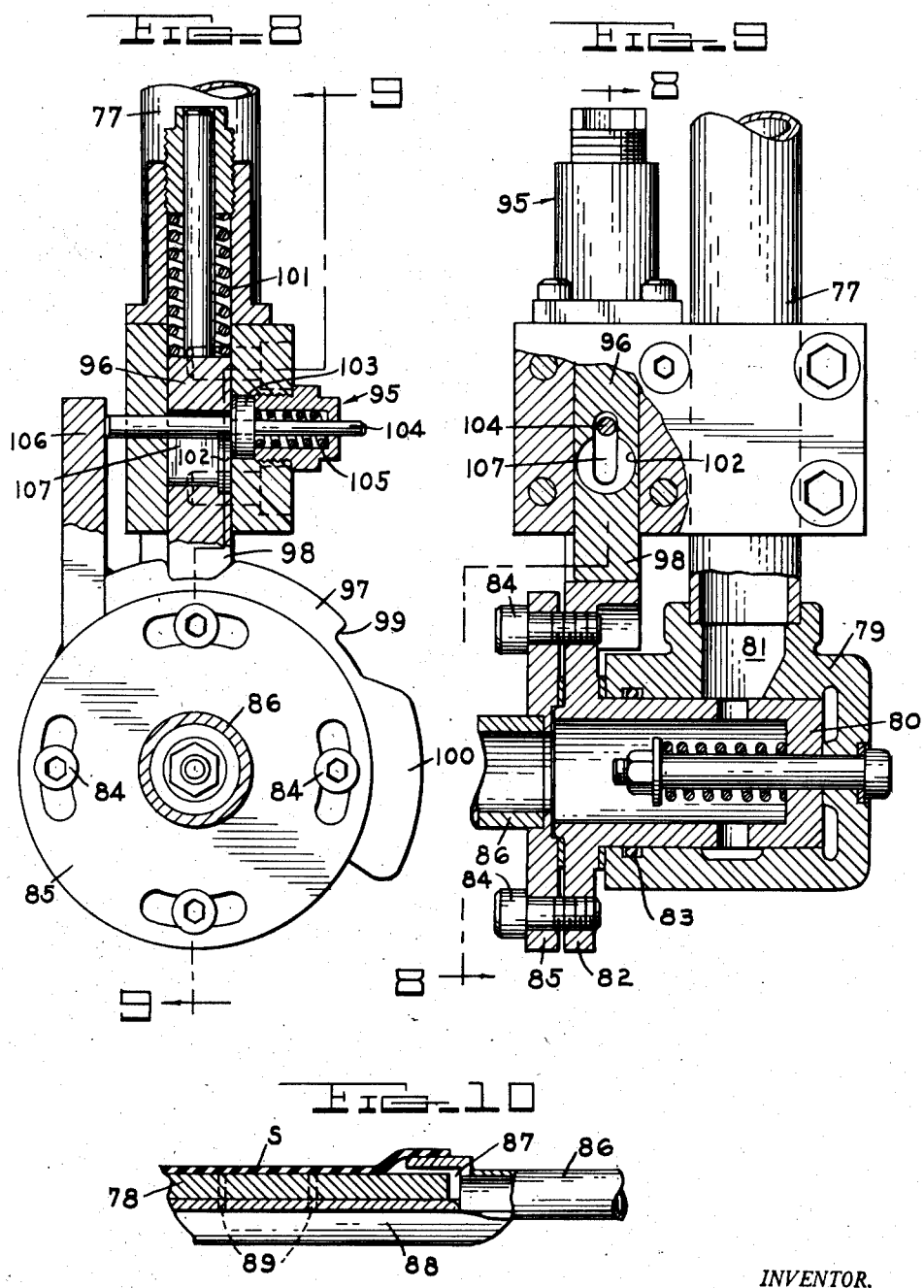

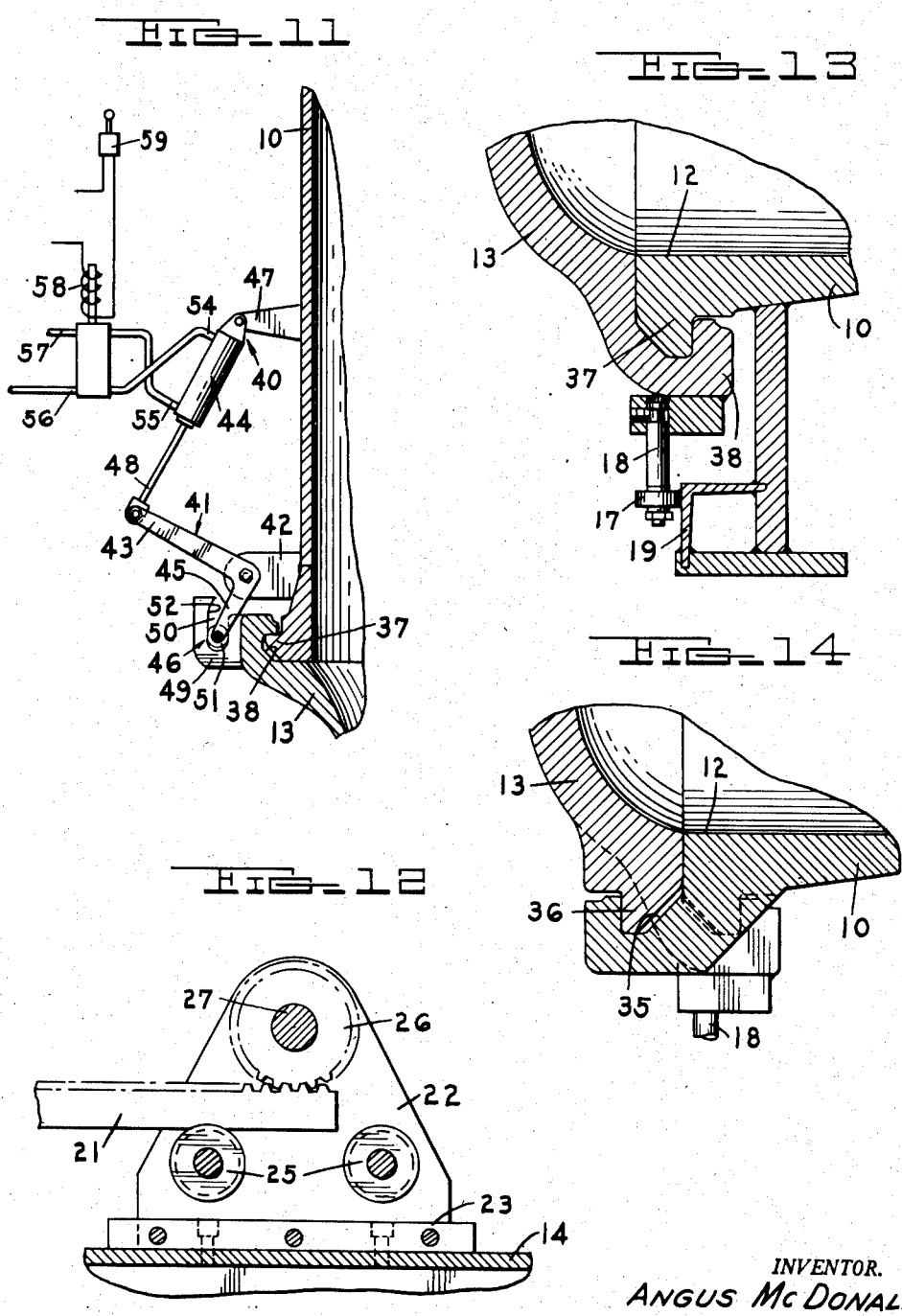

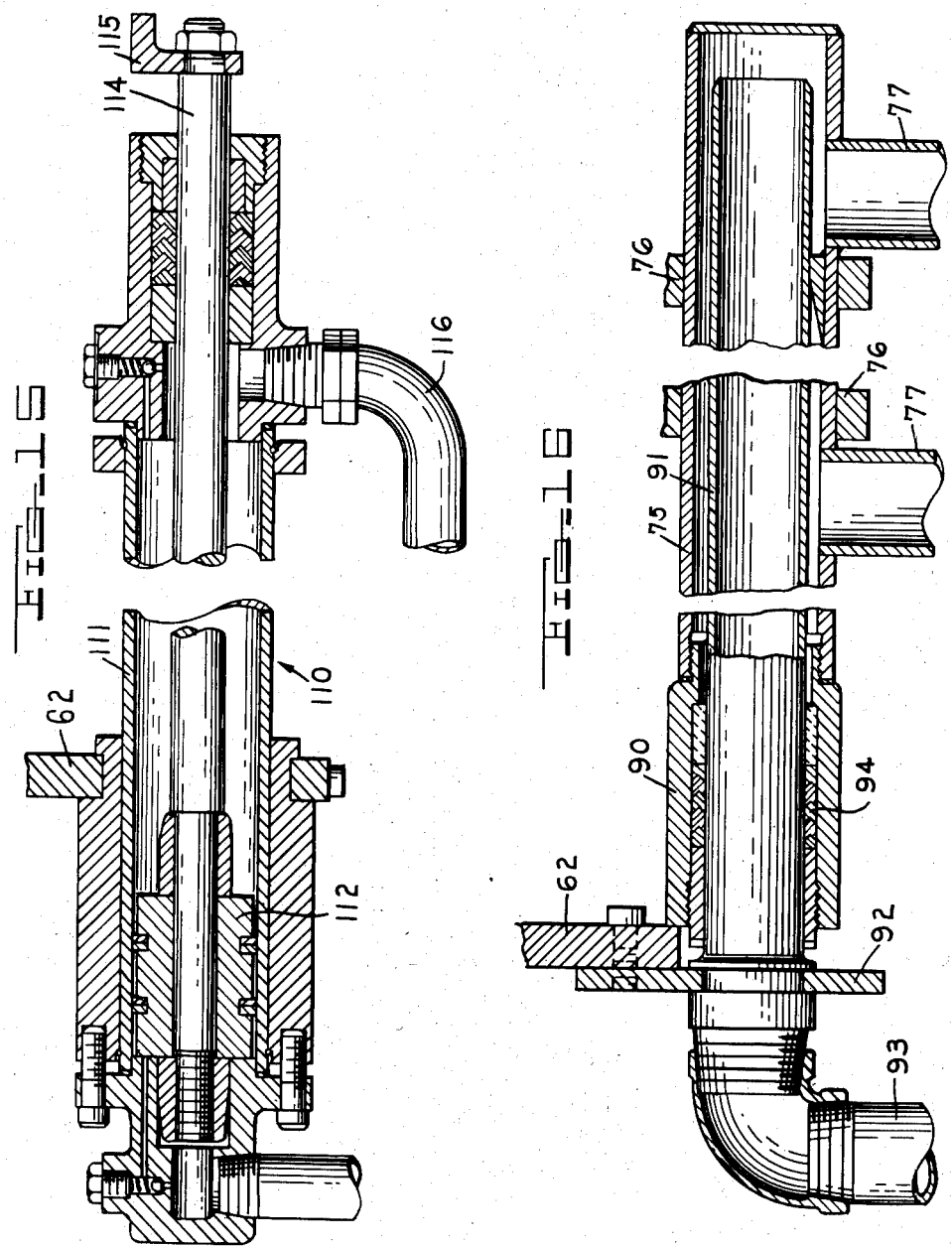

Oct. 13, 1953  A. McDONALD  2,654,910
APPARATUS FOR MANUFACTURING FLOOR MATS
Filed April 19, 1948  9 Sheets-Sheet 9
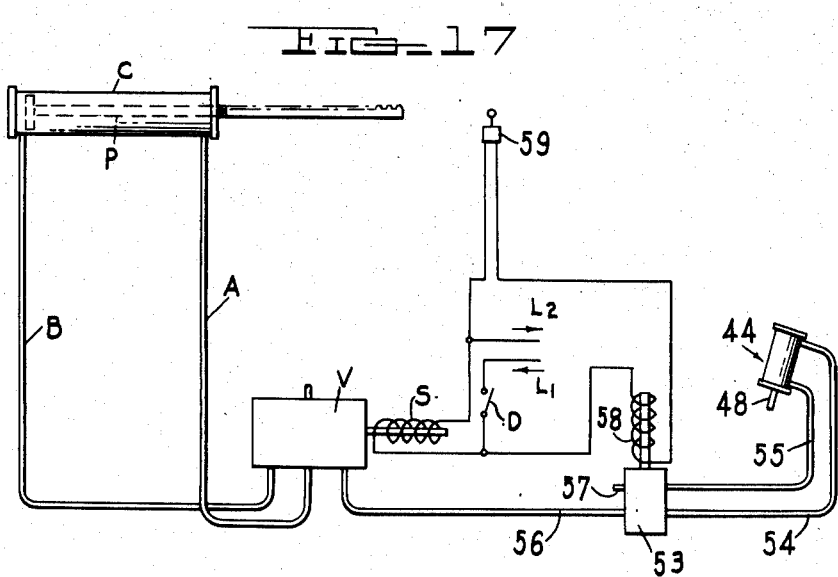
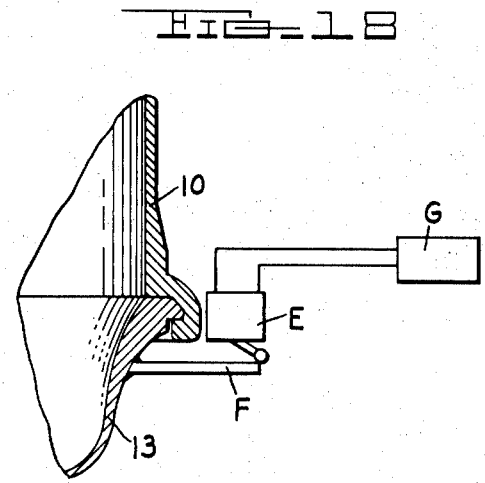
INVENTOR.
ANGUS McDONALD
BY
ATTORNEYS Patented Oct. 13, 1953

2,654,910

UNITED STATES PATENT OFFICE 2,654,910

APPARATUS FOR MANUFACTURING FLOOR MATS

Angus McDonald, Pontiac, Mich., assignor to Baldwin Rubber Company, Pontiac, Mich., a corporation of Michigan Application April 19, 1948, Serial No. 21,883

17 Claims. (Cl. 18—4)

This invention relates to an apparatus for treating sheets of stock. More particularly the invention concerns itself with an improved apparatus for forming contoured mats from sheets of thermosetting materials.

One of the objects of this invention is to simplify, render more efficient and improve generally the manufacture of sheet material requiring special treatment.

A more detailed object of this invention is to substantially increase the production of contoured mats from sheets of vulcanizable material with equipment which occupies considerably less floor space than the apparatus heretofore employed for producing a corresponding number of mats, and which renders it possible to substantially reduce the time required for the curing cycle.

Another object of this invention is to provide a heating chamber with means for supporting a plurality of contoured forms in substantially upright positions with adjacent forms positioned in close relationship so as to occupy a minimum space within the chamber.

Still another object of this invention is to provide apparatus of the above general type wherein the forms are supported on hangers individually movable from positions within the heating chamber to a loading station located just beyond the open end of the chamber and wherein the hangers have means pivotally engaging the respective forms in a manner to enable swinging the latter to substantially horizontal positions at the loading station. Thus removal of the sheets of vulcanizable stock from and application of the sheets to the forms at the loading station is not only facilitated, but may be accomplished with a minimum effort on the part of the workers.

A further object of this invention is to provide mechanisms for independently moving the respective forms into and out of the heating chamber characterized in that the forms are continuously urged to positions within the heating chamber. Thus accidental movement of the forms toward their outermost or loading positions is prevented.

A still further object of this invention is to alternately move the forms in succession from positions within the chamber to the loading station and back into the chamber from the loading station. With this arrangement one form is moved at a time from the chamber to the loading station where the vulcanized sheet thereon may be removed and an uncured sheet applied while the remaining forms are retained in the heated atmosphere of the chamber. Also the construction is such that after a sheet of uncured stock is applied to the form at the loading station, this form is returned to the chamber before the next adjacent form is withdrawn from the chamber. Thus full advantage is taken of the residual heat in the chamber during the loading and unloading phase.

Still another object of this invention is to provide improved means for supporting and operating the door for the open end of the heating chamber.

The foregoing as well as other objects will be made more apparent as this description proceeds, especially when considered in connection with the accompanying drawings, wherein:

Figure 1 is a fragmentary longitudinal sectional view through a part of the apparatus forming the subject matter of this invention;

Figure 2 is a side elevational view partly broken away of the heating chamber and illustrating one of the contoured forms in a loading position with respect to the open end of the heating chamber;

Figure 3 is a fragmentary front elevational view of the open end of the heating chamber and illustrating the closure provided for the open end of the chamber;

Figure 4 is a fragmentary end elevational view of the heating chamber showing a plurality of forms in position within the heating chamber;

Figure 5 is a sectional view taken substantially on the line 5—5 of Figure 1;

Figure 6 is a sectional view taken on the line 6—6 of Figure 3;

Figure 7 is a cross sectional view taken on the line 7—7 of Figure 1;

Figure 8 is a sectional view taken on the line 8—8 of Figure 9;

Figure 9 is a sectional view taken on the line 9—9 of Figure 8;

Figure 10 is a sectional view taken on the line 10—10 of Figure 1;

Figure 11 is a sectional view taken on the line 11—11 of Figure 3;

Figure 12 is a sectional view taken on the line 12—12 of Figure 6;

Figure 13 is a fragmentary sectional view of a part of the closure showing the latter in its closed position with respect to the open end of the chamber;

Figure 14 is also a fragmentary sectional view of the closure structure;

Figure 15 is a longitudinal sectional view through the hydraulic operating means for the forms;

Figure 16 is a longitudinal sectional view showing the suction means for clamping the sheets of vulcanizable material to their respective forms;

Figure 17 is a fluid pressure diagram of the door closing mechanism; and

Figure 18 is a fragmentary sectional view showing the cycle controller switch.

Although the apparatus about to be described may be successfully employed for treating various different types of sheets on a commercial production basis, nevertheless, for the purpose of illustrating the present invention, the apparatus is described in connection with a process for curing sheets of vulcanizable stock to a predetermined contour. More specifically, the apparatus finds particular utility when used in the fabrication of vehicle body floor mats of the type formed of a thermosetting material such as rubber, or rubber composition, and having a contour which corresponds to the shape of the flooring in connection with which the mats are to be used.

The present invention is an improvement in many respects on the method and apparatus described in the Angus McDonald Patent No. 2,238,534 dated April 15, 1941. As in the above patent, a plurality of uncured sheets of thermosetting material are simultaneously vulcanized to the specified contour in a heating chamber by the use of a curing cycle very much the same as that set forth in the McDonald patent.

With the above in view, reference will now be made more in detail to the drawings, wherein it will be noted that the numeral 10 designates a cylindrical vulcanizing or heating chamber closed at the rear end 11 and having an opening 12 at the front end. Upon reference to Figure 3 of the drawings, it will be noted that a door 13 is provided for closing the opening 12 in the front end of the heating chamber 10.

The door 13 is suspended from a rail 14 suitably supported above the heating chamber 10 and extending transversely of the heating chamber. In detail, a pair of carriages 15 are supported on the rail in spaced relationship to each other lengthwise of the rail for movement along the rail, and are connected to the upper end of the closure 13 by a suitable bracket 16. The arrangement is such that movement of the carriages along the rail 14 imparts a corresponding movement to the door, and the length of the rail is sufficient to enable moving the door 13 to a position at one side of the heating chamber wherein the opening 12 is completely exposed. The lower end of the door is guided by a roller 17 supported on the door by a vertical pin 18 and engageable with a guide rail 19. The rail 19 cooperates with the rail 14 and carriages 15 to confine movement of the door 13 to a path of travel which enables accurately locating the door in its closed position with respect to the heating chamber.

In the present instance the door 13 is power operated by a fluid pressure motor 20 comprising a cylinder C secured to the top of the rail 14 and a piston P slidably supported in the cylinder. A rack 21 is connected at one end to the piston P and supported intermediate the ends for sliding movement as a unit with the piston. Referring now to Figure 6 of the drawings, it will be noted that the rack 21 extends between laterally spaced vertical side members 22 on a bracket 23 having the base portion secured to the top of the rail 14 and having a pair of shafts 24 supported at opposite ends on the side members 22. Rollers 25 are journalled on the shafts 24 between the side members of the bracket in positions to engage the underside of the rack 21 and support the latter. It will further be noted from Figure 6 of the drawings that the rollers 25 maintain the rack in meshing relation with a pinion 26 keyed or otherwise secured to a shaft 27 having the opposite ends respectively journalled in the members 22 of the bracket by bearings 28. The shaft 27 projects beyond one side of the bracket 23 and a sprocket wheel 29 is secured to the projecting end of the shaft.

Referring again to Figure 3 of the drawings, it will be noted that the sprocket wheel is connected to a somewhat smaller sprocket wheel 30 by a chain 31. The sprocket wheel 30 is secured to a shaft 32 journalled on a bracket 33 which is also secured to the top of the rail 14. One of the links at the bottom side of the chain 31 is pinned or otherwise connected to the upper end of an arm 34 having the lower end secured to the bracket 16. Thus it will be noted that the door 13 is operatively connected to the bottom side of the chain 31 for operation by the latter.

It will also be observed from Figure 3 of the drawings that the sprockets 29 and 30 are located on the rail 14 in such positions with respect to the closed and open positions, respectively, of the door 13, that the lower side of the chain 31 is of sufficient length to permit the extent of travel of the door 13 required to locate the same in both the open and closed positions aforesaid. The stroke of the rack 21 is, of course, of sufficient length to impart the required movement to the chain 31. The rack 21 is, of course, reciprocated by alternatively admitting fluid pressure to and exhausting the same from, opposite ends of the cylinder.

As shown in Figure 17 of the drawings, the opposite ends of the cylinder C are connected to a four-way valve V by conduits A and B, respectively. The valve V may be of any suitable construction having a valve member (not shown) movable in opposite directions for alternately connecting the conduits A and B to a source of fluid under pressure and to an exhaust. The valve member is operated by a solenoid S to connect the conduit A to the source of fluid under pressure, and to connect the conduit B to the exhaust. Movement of the valve member to reverse the above connections may be accomplished in the usual manner by a spring (not shown) if desired. In any case the piston P is moved in a direction to close the door 13 by energizing the solenoid S. This solenoid is connected in an electric circuit with a switch D, which is manually closed to energize the solenoid S and effect closing of the door. When the door is completely closed, a limit switch E is closed by a finger F on the door to initiate the operation of a cycle controller indicated diagrammatically by the numeral G. This controller is not shown in detail, as it may be of the same type shown and described in some detail in the McDonald Patent No. 2,238,534 dated April 15, 1941. One of the duties of this controller is to open the circuit to the solenoid S at the end of the curing cycle, and permit operation of the valve V to open the door 13.

Referring now to Figures 1, 3, 13 and 14 of the drawings, it will be noted that an inwardly opening semicircular channel 35 is formed on the heating chamber at the open end of the latter. The channel 35 is positioned at one side of the opening 12 to receive the corresponding marginal side edge portion 36 of the door 13 when the latter is moved to its closed position with respect to the heating chamber 10. Positioned at the opposite side of the opening 12 in the heating chamber and forming a continuation of the channel 35 is an outwardly extending semicircular flange 37. The flange 37 is adapted to engage in a semicircular channel 38 formed on the door 13 at the marginal edge thereof, which is opposite the marginal edge portion 36. The arrangement is such that when the door 13 is in its closed position with respect to the opening 12, the marginal edge portion 36 of the closure is received in the channel 35, and the semicircular flange 37 on the heating chamber is received in the channel 38 formed on the door. In the closed position of the door, the channels 35 and 38 form, in effect, continuations of one another, and cooperate to hold the door in intimate closing relation to the opening 12.

In Figure 11 of the drawings, I have shown a mechanism 40 for assisting in closing and opening the door 13. The mechanism 40 comprises a bell crank lever 41 supported intermediate the ends for pivotal movement in a substantially horizontal plane on a bracket 42, which is welded or otherwise secured to the side of the heating chamber provided with the semicircular flange 37. The bell crank lever has a relatively long arm 43 which is pivoted at the outer end to a fluid motor 44 and has an arm 45 engageable with a suitable latch 46 on the adjacent side of the door 13.

The fluid motor 44 comprises a cylinder having the rear end pivoted to a bracket 47, which in turn is welded or otherwise secured to the heating chamber 10. A piston (not shown) is slidably mounted in the cylinder, and is connected through the front end of the cylinder to the arm 43 of the bell crank by a rod 48. The latch 46 comprises a plate 49 secured to the door 13 and having a rearwardly opening slot 50 of sufficient width to receive a roller 51 on the free end of the bell crank arm 45. It will be noted that the portion of the plate 49 at the laterally outer side of the slot 50 projects rearwardly beyond the portion of the plate at the opposite side of the slot to form an abutment 52.

The parts of the mechanism 40 assume the relative positions thereof shown in Figure 11 of the drawing when the door 13 is closed with respect to the heating chamber. Assuming now that the fluid motor 44 is operated to swing the bell crank lever in a clockwise direction, it will be noted that the roller 51 applies a laterally outward thrust on the adjacent portion of the plate 49 to assist movement of the door toward its open position. As the door continues to move toward its open position by the fluid motor 20, the roller disengages from the slot 50 and assumes a position where it contacts with the abutment 52 on the plate 49 as the door 13 subsequently approaches its fully closed position. Thus the roller 51 is located by the abutment 52 in a position for reengagement in the slot 50, and this is accomplished by operating the fluid motor 44 to swing the bell crank lever 41 in a counterclockwise direction. This operation of the fluid motor results in a thrust being applied on the plate 49 by the roller 51 in a direction to assist in the final closing of the door 13. In this connection attention is called to the fact that the engagement of the abutment 52 on the plate 49 with the roller 51 on the bell crank lever also enables the fluid motor to act as a shock absorber for the door.

Operation of door mechanism

As shown in Figure 11 of the drawings the opposite ends of the cylinder for the fluid motor 44 are respectively connected to a suitable four-way valve 53 by conduits 54 and 55. The valve 53 has a fluid pressure supply conduit 56 and an exhaust 57 which are alternately connected to opposite ends of the cylinder for the fluid motor 44 in the usual way by a reciprocable valve member, not shown. A solenoid 58 is connected to the valve member and is located in an electric circuit with a limit switch 59 suitably supported on the structure 14 in a position to be closed by the end of the rack 21 as the latter approaches its final door closing position. In fact the construction is such that the limit switch 59 is closed by the rack 21 at the time the roller 51 engages the cam face 52 on the latch 46.

Closing of the limit switch 59 energizes the solenoid 58 and operates the valve 53 to connect the conduit 54 at the upper end of the fluid motor 44 to the supply conduit 56 and to connect the conduit 55 at the bottom of the motor to the exhaust 57. Thus the bell crank lever 41 is swung in a direction to impart a final closing thrust to the door and to firmly hold the door in its closed position. As stated above when the door is completely closed, the controller G is operated by the limit switch E, and a further duty of this controller is to open the limit switch 59 at the end of the curing cycle. As a result, the solenoid is deenergized and the valve 53 is operated by a suitable spring to connect the upper end of the fluid motor to the exhaust 57 and to connect the lower end of the motor to the supply conduit 56. Thus the bell crank 41 is moved by the fluid motor 44 in a direction to swing the roller outwardly against the latch 46 and impart an opening thrust to the door 13.

It will, of course, be understood that provision is made for supplying a fluid to the chamber having sufficient heat and pressure to vulcanize the particular thermosetting sheets selected. The temperature, pressure and period of time required to cure or vulcanize the sheets depends on the nature or composition of the sheets. The present invention is not concerned with the curing technique per se, and accordingly, this disclosure is not complicated by a detailed description of the same. It will suffice to point out that the apparatus featured herein enables practicing substantially the same curing technique disclosed in my Patent No. 2,238,534.

Sheet handling mechanism

Supported in the chamber 10 adjacent the top of the latter are a plurality of pairs of rails or tracks 60 of I cross section. The tracks of each pair are supported one directly above the other in the relationship noted in Figures 4 and 5 of the drawings. The top track 61 of each pair is secured at the rear end to a mounting plate 62 suitably fixed in the chamber at the rear end of the latter, and the front end of each track 61 is connected to the top wall of the chamber adjacent the opening 12 by a vertical member 63. Supported for movement along each track 61 is a carriage 64 having a length approximating the length of the track 61 and having side plates 65 respectively positioned at opposite sides of the track 61. The plates 65 are secured together at opposite ends by brackets 66 extending transversely of the pairs of tracks between the tracks of each pair.

Each carriage has a pair of aligned rollers 67 respectively rotatably supported on the plates 66 at the inner sides of the latter adjacent the rear end of the carriage and respectively having a rolling engagement with the flanges of the track 60 at opposite sides of the center web of this track. A second pair of rollers 68 is similarly supported on the carriage intermediate the ends thereof for rolling engagement with the track 61 and a third pair of rollers 69 are likewise supported on the carriage with the common axis of rotation thereof in vertical alignment with the common axis of the rollers 68. The third pair of rollers on the carriages respectively engage the bottom track 60 of each pair as clearly shown in Figure 7 of the drawings.

Each carriage 64 has a fourth pair of rollers 71 positioned at the front end for engagement with the track 70 in a manner to cooperate with the third pair of rollers 69 to support the track 70 for movement along the track 61 between the positions shown in Figures 1 and 2 of the drawings. In this connection it will be noted that each track 70 has a stop 72 positioned intermediate the pairs of rollers 69 and 71, and located immediately in advance of the rollers 68 when the track 70 is in its rearwardmost position in the chamber. The arrangement is such that when one of the tracks 70 is moved forwardly relative to its associated track 61 a distance approximating the distance between the pairs of rollers 69 and 71, the stop 72 engages the rollers 71 and advances the carriage 64 forwardly along the adjacent track 61 until a second stop 73 on the track 61 is engaged by the pair of rollers 67. Thus the tracks 70 may be moved relative to the tracks 61 a distance approximating their full length while being effectively supported from the tracks 61. It will also be noted that the stops 72 serve to contact the pairs of rollers 69 as the tracks 70 are moved rearwardly to return the carriages to their normal positions in the heating chamber.

Suspended from each track 70 is a hanger 74 comprising a tube 75 having a length approximating the length of the track and removably secured to the underside of the track by two part clamps 76. Depending from each tube 75 adjacent opposite ends thereof is a pair of tubes 77 having means at the lower ends thereof for pivotally supporting a form 78 having a contoured face against which sheets of uncured stock are placed. The hangers 74 pivotally support the respective contoured forms 78 intermediate the top and bottom edges enabling the forms to be swung between substantially upright and horizontal positions. In practice the forms are located in upright positions when in the chamber so as to occupy a minimum space in the chamber and are swung to horizontal positions at the loading station to facilitate loading and unloading the sheets.

Referring now more in detail to the pivotal connections between the hangers and the respective forms, it will be noted that a fitting 79 is secured to the lower end of each tube 77. Each fitting has a journal for rotatably supporting a tubular part 80 communicating with the interior of the adjacent tube 77 through a passage 81 and having a radially outwardly extending attaching flange 82 at the laterally inner end thereof. A suitable O-ring seal 83 is provided for sealing the joint between the fitting and tube. Secured to the laterally inner side of the flange 82 by studs 84 is a plate 85 having a central opening registering with the tubular part 80 and counter-bored to receive the outer end of a tube 86. The laterally inner ends of the tubes 86 at the lower ends of tubes 77 on each hanger 74 are secured to opposite side edges of a form 78 and serve to pivotally connect the form to the hanger. In addition the tubes 86 communicate with a suction chamber indicated in Figure 10 of the drawings by the numeral 87 and surrounding the marginal edges of the form. As shown particularly in Figure 2 of the drawings, the tubes 86 at opposite side edges of each form 78 also communicate with the suction chamber 87 at the top and bottom edges of the form by passages 88.

As shown in Figure 10 of the drawings the marginal edge portions of a sheet S of stock overlaps the outer wall of the suction chamber 87 and the latter communicates with the joint between the sheet and adjacent contoured face of the form. It follows from the above that the suction chamber 87 actually has a fluid connection with the interior of the tube 75 on the associated hanger through the journals 80 so that the application of suction to the tube 75 serves to effectively clamp the sheet S against the form 78. This action may be facilitated, if desired, by forming passages 89 through the form along the passages 88.

Referring now to Figure 16 of the drawings, it will be noted that the tubes 75 are closed at the front ends and are provided with couplings 90 at the rear ends. The couplings 90 respectively slidably engage suction tubes 91 anchored on the wall 62 by brackets 92 and connected to suitable suction producing apparatus (not shown) by the supply conduit 93. The sliding joint between the couplings and respective suction tubes 91 is sealed by a suitable packing 94. The internal diameter of the tubes 75 is greater than the outside diameter of the tubes 91 enabling the suction to be communicated to the forms 78 through the respective hangers 74. It will, of course, be understood that the length of the tubes 91 is sufficient to maintain the required suction connection throughout the full extent of movement of the hangers 74 by the respective tracks 70 between the positions shown in Figures 1 and 2 of the drawings. The purpose of the suction is to effectively hold the sheets S on the respective forms and to facilitate conforming the sheets to the contour of the forms.

It has been stated above that the forms 78 are supported in an upright position while in the chamber and are movable to a substantially horizontal position when advanced to the loading station. In order to hold the forms in either of the two above named positions suitable latch mechanisms 95 are respectively associated with the pivotal connections between the forms and hangers. As shown in Figures 8 and 9 of the drawings, the latch mechanisms 95 comprise brackets respectively clamped to the hanger tubes 77 adjacent the lower ends thereof and having provision for slidably supporting bolts 96. The lower ends of the bolts respectively engage cams 97 formed on the peripheral surfaces of the radial flanges 82. Each cam 97 is formed with a pair of circumferentially spaced notches 98 and 99. When the bolts 96 are in engagement with the notches 98, the hangers are positioned with the forms extending substantially vertical and when the bolts are engaged in the notches 99 the hangers are positioned with the forms extending generally horizontal.

In order to permit swinging movement of the forms from their horizontal to their vertical positions, some means must be provided for retracting the bolts 96. For this purpose each cam 97 is formed with an elevated step 100 positioned circumferentially beyond the notch 99, as shown in Figure 8 of the drawings. Thus when it is desired to swing the forms from their horizontal positions back to their vertical positions, the forms are merely tipped in a direction to enable the bolts to ride up on the steps 100. The bolts 96 are normally urged into engagement with the cams 97 by coil springs 101 suitably supported in positions to act on the upper ends of the bolts. As the bolts are moved upwardly suitable circular recesses 102 in one side of the bolts register with an enlargement 103 on a plunger 104 enabling the enlargement to enter the recess in response to the action of a coil spring 105 on the plunger. With this construction the bolts 96 are retained in their retracted positions while the forms are swung back to their upright positions. As the forms approach their upright positions, provision is made for moving the plungers 104 against the action of the springs 105 to disengage the enlargement 103 from the respective recesses 102 and permit the springs 101 to again move the bolts downwardly into the notches 98. For accomplishing this result a lug 106 is fixed on each flange 82 in a position to abut the free end of the associated plunger 104 and move the same to its released position shown in Figure 8 when the form assumes an upright position. In this connection it will be noted that the free end of each plunger is projected through a slot 107 formed in the bolt for contact with the lug 106.

In accordance with this invention the hangers are independently movable into and out of the heating chamber to the positions thereof shown in Figures 1 and 2 of the drawings. For accomplishing the above result, a hydraulic motor 110 is associated with each hanger 74. As shown in Figure 15 of the drawings, each hydraulic motor comprises a cylinder 111 and a piston 112 slidably supported in the cylinder. The cylinder is suitably clamped on the wall 62 and the rear end of the cylinder projects through the rear wall 11 of the heating chamber for connection to a source of hydraulic fluid under pressure through a distributing valve 113. The number of outlets in the distributing valve 113 correspond to the number of hangers 74, and these outlets are respectively connected to the rear ends of the hydraulic motors for the hangers. The distributing valve employed may be of conventional design and is indexed in any accepted manner to successively connect the rear ends of the cylinders 111 to the source of fluid supply. Of course it will be understood that the distributing valve is equipped with means for connecting the rear end of the cylinder just serviced to a reservoir before connecting the next preceding cylinder to the source of supply. Thus each fluid motor piston is moved forwardly and rearwardly to complete its cycle of operation before the piston in the next adjacent motor is operated.

Each piston 112 is connected to an operating rod 114 which extends forwardly through the front end of the associated cylinders 111 and is provided with a bracket 115 at the front end thereof. The brackets 115 are respectively secured to the front ends of the tracks 70 by the upper curved halves of the clamps 76, and the stroke of the piston is sufficient to move the hangers 74 on the tracks between the two positions shown in Figures 1 and 2 of the drawings. However, the flow of fluid pressure to the rear ends of the cylinders 111 is controlled by the distributing valve 113 in a manner such that one hanger is moved from a position in the heating chamber to the loading station and is returned to the heating chamber before the next adjacent hanger is operated. Thus only one hanger at a time is located at the loading station, and this not only facilitates removing a cured sheet from and applying an uncured sheet to the form on the hanger, but in addition, allows for maintaining the sheets in the heated atmosphere of the chamber for a longer period of time.

It will further be noted from Figure 15 of the drawings that the front end of each cylinder 111 is also connected to a source of hydraulic fluid supply by a conduit 116. This conduit continuously supplies fluid to the cylinder in advance of the piston 112. This fluid, however, is at a lower pressure than the fluid admitted to the rear end of the cylinder by the distributing valve, but nevertheless, applies sufficient force on the piston to return the latter to its rearwardmost position in the cylinder when the front end of the latter is connected to exhaust. Thus a condition is obtained where the forms 74 are continuously urged to positions within the heating chamber, and this is highly advantageous in that it not only simplifies the distributing valve, but in addition, prevents accidental movement of the hangers or forms from their operative positions in the heating chamber 10.

What I claim as my invention is:

1. In apparatus for curing a sheet of vulcanizable stock, a heating chamber having an opening, a hanger assembly supported in the chamber for movement into and out of the chamber through the opening in the latter, means continually urging the hanger assembly to a position within the chamber, selectively operable means for moving the hanger assembly through the opening in the chamber to a position exteriorly of the chamber against the action of the first named means, a form having a surface against which a sheet of vulcanizable material is adapted to be placed and means supporting the form on the hanger assembly with the supporting surface of the form in a substantially upright position, said last named means including pivots enabling swinging movement of the form from the substantially upright position to a substantially horizontal position.

2. In apparatus for curing a sheet of vulcanizable stock, a heating chamber having an opening, a hanger assembly supported in the chamber for movement into and out of the chamber through the opening in the latter, means continually urging the hanger assembly to a position within the chamber, selectively operable means for moving the hanger assembly through the opening in the chamber to a position exteriorly of the chamber against the action of the first named means, a form having a surface against which a sheet of vulcanizable material is adapted to be placed and pivoted to the hanger assembly for swinging movement from a substantially upright position to a substantially horizontal position, and a latch for holding the form in an upright position and releasable to enable swinging the form to a substantial horizontal position.

3. In apparatus for curing sheets of vulcanizable stock, a heating chamber having an opening, a plurality of hangers, means supporting the hangers in the chamber in side by side relationship crosswise of the opening in said chamber for sliding movement independently of one another into and out of the chamber through the opening in the latter, a corresponding number of forms having contoured surfaces against which sheets of vulcanizable stock are placed and respectively pivotally connected intermediate the top and bottom edges on the hangers, and means normally holding the forms in upright positions relative to the hangers including latch elements releasable to permit swinging the forms to substantially horizontal positions.

4. In apparatus for curing sheets of vulcanizable stock, a heating chamber having an opening, a plurality of hangers slidably supported in the chamber for movement independently of one another into and out of the chamber through the opening in the latter, a corresponding number of forms having surfaces against which sheets of vulcanizable material are placed and respectively pivotally supported in substantially upright positions on the hangers, means acting on the respective hangers for continuously urging the latter to positions within the chamber, and selectively operable means for independently moving the hangers against the action of the last named means to positions exteriorly of the chamber.

5. In apparatus for curing sheets of vulcanizable stock, a heating chamber having an opening, a plurality of hangers, means supporting the hangers in the chamber in side by side relationship crosswise of the opening in the chamber for sliding movement independently of one another into and out of the chamber through the opening in the latter, a corresponding number of forms having surfaces against which sheets of vulcanizable material are placed and respectively supported in substantially upright positions on the hangers, and selectively operable means for successively moving the hangers out of the chamber through said opening.

6. In apparatus for curing sheets of vulcanizable stock, a heating chamber having an opening, a plurality of hangers, means supporting the hangers in the chamber in side by side relationship crosswise of the opening in the chamber for sliding movement independently of one another into and out of the chamber through the opening in the latter, a corresponding number of forms having surfaces against which sheets of vulcanizable material are placed and respectively supported in substantially upright positions on the hangers, and selectively operable means for alternatively moving the hangers in succession out of and back into the chamber through said opening.

7. In apparatus for curing sheets of vulcanizable stock, a heating chamber, a guide rail supported in the chamber, a carriage slidable on the rail and movable from a position in the chamber through an opening in the latter, a hanger rail supported on the carriage for sliding movement relative thereto in the direction of movement thereof, and a form suspended from the hanger rail in a substantially upright position and having a surface against which a sheet of vulcanizable stock is placed.

8. In apparatus for curing sheets of vulcanizable stock, a heating chamber, a guide rail supported in the chamber, a carriage slidable on the rail and movable from a position in the chamber through an opening in the latter, a hanger rail supported on the carriage for sliding movement relative thereto in the direction of movement thereof, a hanger suspended from the hanger rail, a form carried by the hanger and having a surface against which a sheet of vulcanizable stock is placed, selectively operable means for moving the hanger rail into and out of the chamber, and means on the hanger rail positioned to engage the carriage after a predetermined extent of travel of the hanger rail to move the carriage along the guide rail in the same direction as the hanger rail.

9. In apparatus for curing sheets of vulcanizable stock, a heating chamber, a plurality of guide rails supported in juxtaposition in the chamber, a carriage slidable on each guide rail and movable along the guide rail through an opening in the chamber, a hanger rail supported on each carriage for movement relative thereto in the direction of movement of the carriage on the guide rail, a form suspended from each hanger rail in a substantially upright position and having a surface against which a sheet of vulcanizable stock is placed, means for independently moving the hanger rails relative to the carriages, and means on the hanger rails positioned to respectively engage the carriages after a predetermined extent of movement of the hanger rails to move the carriages as a unit with the hanger rails.

10. In apparatus for curing sheets of vulcanizable stock, a heating chamber, a guide rail supported in the chamber, a carriage slidable on the rail and movable from a position in the chamber through an opening in the latter, a hanger rail supported on the carriage for sliding movement relative thereto in the direction of movement thereof, a hanger suspended from the hanger rail, a form against which a sheet of vulcanizable stock is placed and pivotally supported intermediate the opposite side edges in a substantially upright position on the hanger, and suction means connected to the form through the hanger for clamping the sheet of vulcanizable stock to the form.

11. In apparatus for curing sheets of vulcanizable stock, a heating chamber having an opening, a plurality of hangers slidably supported in the chamber in side by side relationship crosswise of the opening in said chamber for movement independently of one another into and out of the chamber through the opening in the latter, a corresponding number of forms having surfaces against which sheets of vulcanizable material are placed and respectively supported in substantially upright positions on the hangers, selectively operable means for alternately moving the hangers in succession out of and back into the chamber through said opening, and suction means connected to the respective forms through the hangers for clamping the sheets of vulcanizable stock to the forms.

12. In apparatus for curing sheets of vulcanizable stock, a heating chamber, an elongated tube supported in the chamber and open at the inner end, a second tube slidably supported on the first tube in spaced relation thereto and having the inner end closed, a hanger having a pair of tubular frame members respectively connected to the second tube in spaced relation to each other axially of the latter tube and communicating with the interior thereof, a form supported on the hanger in an upright position and having suction openings adapted to be sealed by a sheet of vulcanizable stock, means pivotally connecting the form to the hanger and having portions connecting the suction openings in the form to the tubular frame members, and suction means connected to the first named tube.

13. In apparatus for curing sheets of vulcanizable stock, a heating chamber, an elongated tube supported in the chamber and open at the inner end, a second tube slidably supported on the first tube in spaced relation thereto and having the inner end closed, a hanger having a pair of tubular frame members respectively connected to the second tube in spaced relation to each other axially of the latter tube and communicating with the interior thereof, a form supported on the hanger in an upright position and having suction openings adapted to be sealed by a sheet of vulcanizable stock, means pivotally connecting the form to the hanger and having portions connecting the suction openings in the form to the tubular frame members, means connected to the second tube for moving the latter along the first tube into and out of the chamber through an opening in one wall of the chamber, and suction means connected to the first tube for clamping a sheet of vulcanizable stock to the form during movement of said hanger.

14. In apparatus for curing sheets of vulcaniazble stock, a heating chamber having an opening at one end, a plurality of guide rails supported within the heating chamber adjacent the top of the latter in side by side relationship crosswise of the opening in said chamber, a hanger supported by each guide rail for sliding movement lengthwise of the guide rail through said chamber opening from a position within the chamber to a position exteriorly of the latter, means between each hanger and its associated guide rail for supporting the hanger from the guide rail when said hanger is moved to a position exteriorly of the chamber, and a plurality of forms having surfaces against which sheets of vulcanizable stock are placed and respectively mounted on the hangers in an upright position.

15. The apparatus defined in claim 14 wherein the means for supporting the hangers in positions exteriorly of the heating chamber comprises a plurality of carriers respectively supported on the guide rails for sliding movement relative to said guide rails in the direction of length of the latter, a plurality of tracks respectively supported on the carriage for sliding movement relative to said carriages in the direction of length of the guide rails, and means for respectively connecting the hangers to said tracks.

16. The apparatus defined in claim 15 having means for moving the tracks independently of one another from positions within the chamber through said opening to positions exteriorly of the chamber and having means on the tracks respectively engageable with the carriages for operating the latter.

17. The apparatus defined in claim 16 having means acting on the respective tracks normally urging the latter to positions within said chamber.

ANGUS McDONALD.

References Cited in the file of this patent

UNITED STATES PATENTS

| Number | Name | Date |
| --- | --- | --- |
| 652,813 | Seiberling | July 3, 1900 |
| 1,013,716 | Adamson | Jan. 2, 1912 |
| 1,014,192 | Williams | Jan. 9, 1912 |
| 1,271,843 | Bradley | July 9, 1918 |
| 1,449,609 | Judelson | Mar. 27, 1923 |
| 1,587,318 | Horton | June 1, 1926 |
| 1,595,247 | Rawlings | Aug. 10, 1926 |
| 1,674,387 | Campbell | June 19, 1928 |
| 2,073,290 | Teague | Mar. 9, 1937 |
| 2,238,534 | McDonald | Apr. 15, 1941 |
| 2,362,672 | Sloan | Nov. 14, 1944 |
| 2,420,813 | Camerota | May 20, 1947 |
| 2,484,419 | Miner | Oct. 11, 1949 |

FOREIGN PATENTS

| Number | Country | Date |
| --- | --- | --- |
| 263,870 | Great Britain | Nov. 3, 1927 |